United States Patent
Kumagai et al.

(10) Patent No.: US 12,508,676 B2
(45) Date of Patent: Dec. 30, 2025

(54) ALUMINUM ALLOY BRAZING SHEET AND METHOD FOR PRODUCING SAME

(71) Applicant: UACJ Corporation, Tokyo (JP)

(72) Inventors: Hidetoshi Kumagai, Tokyo (JP); Tomoki Yamayoshi, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 0 days.

(21) Appl. No.: 18/705,030

(22) PCT Filed: Oct. 5, 2022

(86) PCT No.: PCT/JP2022/037248
§ 371 (c)(1),
(2) Date: Apr. 26, 2024

(87) PCT Pub. No.: WO2023/074289
PCT Pub. Date: May 4, 2023

(65) Prior Publication Data
US 2025/0128360 A1    Apr. 24, 2025

(30) Foreign Application Priority Data
Oct. 29, 2021   (JP) .................................. 2021-177407

(51) Int. Cl.
*B23K 35/00*    (2006.01)
*B23K 35/02*    (2006.01)
*B23K 35/28*    (2006.01)

(52) U.S. Cl.
CPC ........ *B23K 35/0238* (2013.01); *B23K 35/286* (2013.01)

(58) Field of Classification Search
CPC ............ B23K 35/0238; B23K 35/0233; B23K 35/286; B23K 35/22; B23K 35/28;
(Continued)

(56) References Cited

U.S. PATENT DOCUMENTS

| 2019/0291218 A1* | 9/2019 | Itoh | ......................... B23K 35/28 |
| 2021/0213568 A1* | 7/2021 | Yanagawa | ............... C22C 21/00 |

(Continued)

FOREIGN PATENT DOCUMENTS

| CN | 107614717 A | * | 1/2018 | ............... B23K 1/00 |
| JP | 2010-247209 A | | 11/2010 | |

(Continued)

OTHER PUBLICATIONS

Office Action dated Nov. 18, 2025, issued in counterpart JP Application No. 2021-177407, with English translation. (14 pages).

*Primary Examiner* — Kiley S Stoner
(74) *Attorney, Agent, or Firm* — WHDA, LLP

(57) ABSTRACT

Provided is a brazing sheet exhibiting excellent brazing properties where an aluminum material is brazed in an inert gas atmosphere such as a nitrogen gas atmosphere without using a flux. The aluminum alloy brazing sheet used for brazing in an inert gas atmosphere without using a flux, the aluminum alloy brazing sheet comprises: a core material; and a brazing material cladded on one side surface or both side surfaces of the core material, in which the core material is formed of aluminum or an aluminum alloy, the brazing material comprises 4.00 mass % to 13.00 mass % of Si and comprises 0.10 mass % to 2.00 mass % of Mg, with the balance being Al and inevitable impurities, and an integral value of Mg from a surface of the brazing material to a depth of 60 nm is 30 at %×nm to 600 at %×nm.

5 Claims, 1 Drawing Sheet

(58) Field of Classification Search
CPC .. B23K 35/40; B23K 1/0012; B23K 2101/14;
C22C 21/02
USPC ........ 228/56.3, 245–246, 183, 262.5–262.51
See application file for complete search history.

(56) References Cited

U.S. PATENT DOCUMENTS

2022/0184750 A1* 6/2022 Yamayoshi ............. C22F 1/043
2025/0128360 A1* 4/2025 Kumagai ................ C22C 21/02

FOREIGN PATENT DOCUMENTS

| | | | |
|---|---|---|---|
| JP | 2011-252196 A | 12/2011 | |
| JP | 2013-215797 A | 10/2013 | |
| JP | 2014-073520 A | 4/2014 | |
| JP | 2015-526290 A | 9/2015 | |
| WO | 2017/175762 A1 | 10/2017 | |
| WO | WO-2017170204 A1 * | 10/2017 | ............... B21B 1/22 |
| WO | WO-2019172257 A1 * | 9/2019 | ......... B23K 35/0233 |
| WO | WO-2020054564 A1 * | 3/2020 | ............. B23K 20/023 |
| WO | WO-2020071289 A1 * | 4/2020 | ............. B23K 20/04 |
| WO | WO-2020085485 A1 * | 4/2020 | ......... B23K 35/0238 |
| WO | WO-2020085486 A1 * | 4/2020 | ......... B23K 35/0238 |
| WO | 2020/204167 A1 | 10/2020 | |
| WO | 2021/199685 A1 | 10/2021 | |
| WO | 2021/199732 A1 | 10/2021 | |
| WO | 2021/205856 A1 | 10/2021 | |

* cited by examiner

FIG. 1 ( a )
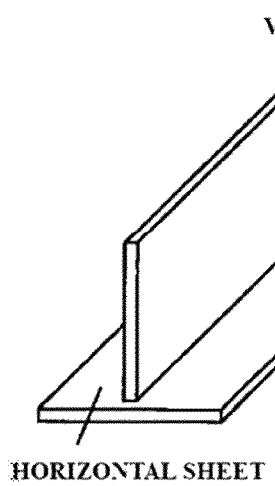
VERTICAL SHEET
SPACER
HORIZONTAL SHEET
FIG. 1 ( b )
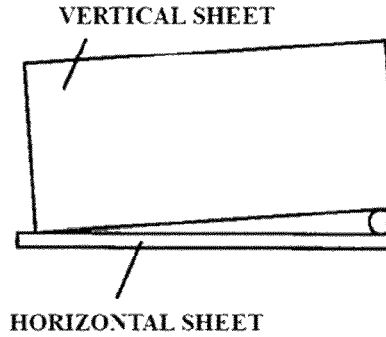
VERTICAL SHEET
SPACER
HORIZONTAL SHEET

ALUMINUM ALLOY BRAZING SHEET AND METHOD FOR PRODUCING SAME

TECHNICAL FIELD

The present invention relates to an aluminum alloy brazing sheet used for brazing in an inert gas atmosphere without using a flux and a method for producing the same.

BACKGROUND ART

Aluminum products such as heat exchangers and parts for machines comprise a lot of parts formed of aluminum materials (The materials comprise aluminum and an aluminum alloy. The same shall apply hereinafter).

Most of these parts are brazed with what is called a brazing sheet that is an aluminum material comprising a core material and a brazing material provided on at least one side surface of the core material.

Performing the brazing joint of the aluminum material (comprising aluminum alloy materials) requires a method for, during the brazing, contacting a melted brazing material to a counterpart material serving as a joint target while an oxide film covering the surface of the brazing material is broken to break an oxide film covering the surface of the counterpart material. Roughly classified, a method for using a flux (a flux brazing method) and a method for heating under vacuum (a vacuum brazing method) are put into practical use as such a method.

Of these methods, the flux brazing method is a method for applying a flux to a joint-expected part, that is, a part to be joined by brazing to perform brazing.

However, the flux brazing method requires an operation of applying the flux before brazing. In addition, insufficient removal of the flux and the residue thereof after completion of brazing may result in not obtaining sufficient surface quality in the case where surface treatment or the like is performed thereafter. Consequently, an increase in the production cost of the aluminum products has been incurred.

On the other hand, the vacuum brazing method is a method for brazing in vacuum without applying the flux to the surface of the joint-expected part.

However, the vacuum brazing method has lower productivity than that of the flux brazing method and is difficult to provide sufficient brazing quality. In addition, a brazing furnace used in the vacuum brazing method is likely to increase a facility cost and a maintenance cost as compared to common brazing furnaces.

Therefore, what is called a flux-free brazing method, in which brazing is performed in an inert gas atmosphere without applying the flux to the surface of the joint-expected part has been developed. Brazing sheets used for the flux-free brazing method comprise an element providing the action of weakening an oxide film or breaking the oxide film in at least one layer forming a stacked-layer structure. As such an element, Mg is frequently used.

Mg has smaller free energy of oxide generation than that of aluminum, and thus can reduce/break the surface oxide film in which aluminum is a main composition during brazing heating.

However, Mg is relatively likely to be oxidized and Mg in a brazing material layer easily forms a MgO film by reacting with oxygen penetrated from the outside.

This MgO film is remarkably stronger than the $Al_2O_3$ film and thus excellent brazing properties are difficult to exhibit because for the brazing sheet on which the MgO film grows and is thickly formed, the MgO film is not broken during the brazing and a melted brazing substance is difficult to wet and spread on the surface.

In other words, brazing defects are likely to occur in the case where the MgO film is thick even when the thickness of the $Al_2O_3$ film on the brazing sheet surface is thin.

Under such a situation, Patent Literature 1 has developed a flux-less brazing method of aluminum characterized in that an Al—Si—Mg-based brazing material comprising 5.0% to 13.0% of Si and 0.1% to 3.0% of Mg in mass % cladded to a core material is placed at an outermost surface, a brazing sheet having an average film thickness of the oxide film on the Al—Si—Mg-based brazing material surface before brazing of 150 Å or less and an average film thickness of the magnesium oxide film in the oxide film is 20 Å or less is used, the Al—Si—Mg-based brazing material in the brazing sheet and a brazing target member are closely contacted in the non-oxidizing atmosphere having an oxygen concentration of 50 ppm or less without reduced pressure, and the brazing joint of the core material and the brazing target member is performed at the closely contacted part using the Al—Si—Mg-based brazing material without the flux.

Patent Literature 1 has disclosed that controlling the thickness of the MgO film on the brazing material surface to be thin requires to equally set an average film thickness of the oxide film on the brazing material surface to 150 Å or less regardless of the composition of the oxide film.

Patent Literature 2 has disclosed a method in which an aluminum composite material comprising an aluminum brazing layer on which a cleaned surface is formed by alkaline cleaning, in which the cleaning medium used during the alkaline cleaning comprises an organic or inorganic complexing agent in addition to sodium hydroxide, and the cleaned surface of the aluminum brazing layer is at least partially exposed or comprises exposed silicon particles, is used for a flux-less thermal joint process in the presence of a protective gas.

CITATION LIST

Patent Literature

Patent Literature 1: Japanese Patent Publication 2013-215797-A

Patent Literature 2: Japanese Translation of PCT Application 2015-526290-T

SUMMARY OF INVENTION

Technical Problem

The brazing sheet described in Patent Literature 1 has tried to reduce generation of the brazing defects by controlling the thickness of the MgO film (generated during the production of the brazing sheet) on the brazing material surface before brazing heating to be thin.

The method described in Patent Literature 2 has tried to reduce generation of brazing defects by fully removing a thermal oxide film of aluminum (generated during the production of the brazing sheet) before the brazing heating.

However, according to the study conducted by the inventors of the present invention, it has been found that the generation of the brazing defects cannot be sufficiently reduced in practical use even using the methods described in Patent Literature 1 and Patent Literature 2.

Under such circumstances, an object of the present invention is to provide a brazing sheet that can exhibit excellent brazing properties in the case where an aluminum material is brazed in an inert gas atmosphere such as a nitrogen gas atmosphere without using a flux and a method for producing the same.

Solution to Problem

According to the study conducted by the inventors of the present invention, it has been found that sufficient brazing properties cannot be secured even when the brazing sheet is subjected to acid cleaning or alkali cleaning according to the description in Patent Literature 1 in order to set the average film thickness of the oxide film on the brazing material surface to 150 Å or less.

This has been considered because a considerable amount of crystalline $Al_2O_3$ is removed when the thickness of the oxide film on the brazing material surface is 150 Å or less by the acid cleaning, the alkali cleaning, or the like.

With regard to this point, according to the study conducted by the inventors of the present invention, for example, in an aluminum alloy brazing sheet having a two-layer structure constituted of a brazing material and a core material each of which Mg is added to, Mg added to a brazing material layer is diffused into an aluminum oxide film along the defects of the boundary between the crystalline $Al_2O_3$ generated at the heating process during the brazing sheet production and an amorphous natural oxide film of aluminum existing from the initial stage is considered to react with $Al_2O_3$, resulting in forming particles and segments of $Al_2O_3$ by generating $MgAl_2O_4$. However, sufficient brazing properties are considered to be unachievable due to difficulty in diffusing Mg described above and in causing reduction/break of the aluminum oxide film by Mg when a considerable amount of the crystalline $Al_2O_3$ generated at the heating process is removed.

In the method described in Patent Literature 2, it has been found that although the thermal oxide film of aluminum generated during the production of the brazing sheet is fully removed by applying etching to an extent that silicon is exposed on the surface of the brazing material, the strong amorphous natural oxide film of aluminum is thoroughly generated and the crystalline $Al_2O_3$ acting as the starting point of reduction/break of the aluminum oxide film does not exist in the case where the thermal oxide film of aluminum generated on the surface of the brazing material during the production of the brazing sheet is fully removed. Consequently, wettability caused by only reduction/break of the aluminum oxide film with Mg comprised in the brazing material during melting of the brazing substance is insufficient and generation of the brazing defects cannot be prevented.

As described above, fully removing the thermal oxide film of aluminum generated during the production causes thorough generation of the strong amorphous natural oxide film of aluminum. In this case, the crystalline $Al_2O_3$ acting as the starting point of reduction/break of the aluminum oxide film also does not exist and thus the reduction/break of the aluminum oxide film caused by Mg comprised in the brazing material is insufficient.

Due to further study conducted by the inventors of the present invention base on the above findings, the inventors of the present invention have found that in the case where the aluminum alloy brazing sheet using the brazing material comprising Mg is produced when sufficient brazing properties of the aluminum alloy brazing sheet in practical use is obtained, not controlling the thickness of the MgO film on the brazing material surface to be thin or fully removing the aluminum oxide film on the brazing material surface during the production of the brazing sheet as in conventional methods, but, on the contrary, forming the thermal oxide film of aluminum (comprising the crystalline $Al_2O_3$) on the brazing material surface during the production of the aluminum alloy brazing sheet in some extent allows the thermal oxide film of aluminum to be easily fragmentized in the course of brazing heating while the generation of a MgO-concentrated layer is reduced.

In other words, when the aluminum alloy brazing sheet using the brazing material comprising Mg is produced, in a hot rolling process and an annealing process, an amorphous aluminum oxide film is grown on the brazing material surface and the crystalline $Al_2O_3$ is formed in such an amorphous aluminum oxide film, whereby defects are generated at the interface between the amorphous aluminum oxide film and the crystalline $Al_2O_3$ or the inside of the crystalline $Al_2O_3$, diffusion of Mg is accelerated so as to form the MgO film, resulting in factors that deteriorate the brazing properties.

Therefore, removing the MgO film by etching under appropriate conditions after the hot rolling process and the annealing process results in leaving the amorphous aluminum oxide film in which the crystalline $Al_2O_3$ locally exists by leaving the amorphous aluminum oxide film without fully removing this film while the MgO-concentrated layer is reduced in amount. This crystalline $Al_2O_3$ existing locally comprises a small amount of diffused Mg and thus existence of the amorphous aluminum oxide film in which the crystalline $Al_2O_3$ locally exists can be defined by using this Mg amount as an index.

On the other hand, reducing the MgO-concentrated layer in amount and fully removing the amorphous aluminum oxide film by etching results in making an aluminum oxide film formed thereafter amorphous. Consequently, the formed aluminum oxide film is not the amorphous aluminum film in which the crystalline $Al_2O_3$ locally exists and Mg rarely exists in the oxide film.

On the contrary, insufficient etching causes the MgO-concentrated layer to remain more than a desired amount.

As described above, a brazing sheet having a Mg amount in an appropriate range in the amorphous aluminum oxide film in which the crystalline $Al_2O_3$ locally exists is considered to allow excellent brazing properties to be exhibited.

As a result of further study conducted by the inventors of the present invention based on the above idea, the inventors of the present invention have found that the above technical problem can be solved by an aluminum alloy brazing sheet in which an integral value of Mg from the brazing material surface to a depth of 60 nm, determined as an index, is within a certain range and have accomplished the present invention based on this finding.

Namely, the present invention provides (1) an aluminum alloy brazing sheet used for brazing in an inert gas atmosphere without using a flux, the aluminum alloy brazing sheet comprising:
  a core material; and
  a brazing material cladded on one side surface or both side surfaces of the core material, in which
  the core material is formed of aluminum or an aluminum alloy,
  the brazing material comprises 4.00 mass % to 13.00 mass % of Si and comprises 0.10 mass % to 2.00 mass % of Mg, with the balance being Al and inevitable impurities, and an integral value of Mg from a surface of the brazing material to a depth of 60 nm is 30 at %×nm to 600 at %×nm, (2) the aluminum alloy brazing sheet according to (1), further comprising one or two or more elements selected from 1.00 mass % or less of Bi, 0.05 mass % or less of Na, 0.05 mass % or less of Sr, 0.05 mass % or less of Sb, 8.00 mass % or less of Zn, 4.00 mass % or less of Cu, 1.00 mass % or less of Fe, 1.00 mass % or less of Mn, 0.30 mass % or less of Cr, 0.30 mass % or less of Ti, 0.30 mass % or less of Zr, 0.10 mass % or less of In, 0.10 mass % or less of Sb, and 0.10 mass % or less of Sn, (3) the aluminum alloy brazing sheet according to (1) or (2), further comprising an intermediated material formed of aluminum or an aluminum alloy between the core material and the brazing material, (4) a method for producing the aluminum alloy brazing sheet according to any one of (1) to (3), the method comprising:

a step of performing heating during one or more times of annealing treatment selected from intermediate annealing during pass of cold rolling and final annealing after pass of final cold working so that a value of a diffusion amount D represented by Formula (I):

$$D = \Sigma D_0 \cdot \exp\left(-Q/(RTn)\right) \cdot \Delta tn \quad (I)$$

(in Formula (I), Tn represents a heating temperature (K) at each infinitesimal time when a total heating time (second) in the intermediate annealing and the final annealing is separated by an infinitesimal time $\Delta tn$ (second), $D_0=1.24\times10^{-4}$ (m²/s), Q=130 (kJ/mol), and R=8.3145 (J/mol·K)) is $7.0\times 10^{-10}$ m² or less, when an aluminum alloy brazing sheet is produced by performing at least hot working, cold working, and one or more times of annealing treatment selected from one or more times of the intermediate annealing during pass of rolling in the cold working and the final annealing after pass of the final cold working to a stacked product with an ingot for the core material and an ingot for the brazing material on one side surface or both side surfaces of the ingot for the core material stacked, and (5) the method for producing the aluminum alloy brazing sheet according to (4), in which an annealed product is obtained by applying one or more times of annealing treatment selected from the one or more times of intermediate annealing during pass of the rolling in the cold working and the final annealing after pass of the final cold working and thereafter an etching treatment of the brazing material surface of the annealed product is performed using one of or both of an acid and an alkaline solution.

Advantageous Effect of Invention

According to the present invention, a brazing sheet that can exhibit excellent brazing properties in the case where an aluminum material is brazed in an inert gas atmosphere such as a nitrogen gas atmosphere without using a flux and a method for producing the same can be provided.

BRIEF DESCRIPTION OF DRAWINGS

FIGS. 1(a) and 1(b) are views illustrating the form of an assembled body used at the time of evaluation of brazing properties in Examples and Comparative Examples of the present application, in which FIG. 1(a) illustrates a perspective view of the assembled body and FIG. 1(b) illustrates a side view of the assembled body.

DESCRIPTION OF EMBODIMENTS

First, an aluminum alloy brazing sheet according to the present invention will be described.

The aluminum alloy brazing sheet according to the present invention is an aluminum alloy brazing sheet used for brazing in an inert gas atmosphere without using a flux, the aluminum alloy brazing sheet comprising:

a core material; and a brazing material cladded on one side surface or both side surfaces of the core material, in which the core material is formed of aluminum or an aluminum alloy, the brazing material comprises 4.00 mass % to 13.00 mass % of Si and comprises 0.10 mass % to 2.00 mass % of Mg, with the balance being Al and inevitable impurities, and an integral value of Mg from a surface of the brazing material to a depth of 60 nm is 30 at %×nm to 600 at %×nm.

The aluminum alloy brazing sheet according to the present invention comprises at least the core material and the brazing material cladded on one side surface (on any one of main surfaces) or both side surfaces (on both main surfaces) of the core material.

In the aluminum alloy brazing sheet according to the present invention, the core material is formed of aluminum or an aluminum alloy.

In the aluminum alloy brazing sheet according to the present invention, in the case where the core material is formed of aluminum, the purity of aluminum is not particularly limited and is preferably 99.00 mass % to 99.99 mass % and more preferably 99.50 mass % to 99.99 mass %.

In the aluminum alloy brazing sheet according to the present invention, in the case where the core material is formed of an aluminum alloy, the aluminum alloy comprises one or two or more elements selected from 1.20 mass % or less and preferably 0.10 mass % to 0.70 mass % of Fe, 1.20 mass % or less and preferably 0.10 mass % to 1.00 mass % of Si, 2.00 mass % or less and preferably 0.10 mass % to 1.00 mass % of Cu, 2.00 mass % or less and preferably 0.30 mass % to 1.80 mass % of Mn, 3.00 mass % or less and preferably 0.50 mass % to 3.00 mass % of Zn, 0.30 mass % or less and preferably 0.10 mass % to 0.20 mass % of Cr, 0.30 mass % or less and preferably 0.10 mass % to 0.20 mass % of Ti, 0.30 mass % or less and preferably 0.10 mass % to 0.20 mass % of Zr, 0.10 mass % or less and preferably 0.01 mass % to 0.03 mass % of In, and 0.10 mass % or less and preferably 0.01 mass % to 0.10 mass % of Sn, and one or two or more elements selected from 1.00 mass % or less and preferably 0.10 mass % to 1.00 mass % of Bi, 3.00 mass % or less and preferably 0.10 mass % to 1.80 mass % Mg, 3.00 mass % or less and preferably 0.10 mass % to 1.80 mass % of Li, and 3.00 mass % or less and preferably 0.10 mass % to 1.80 mass % of Ca, if necessary, with the balance being Al and inevitable impurities.

Examples of the inevitable impurities may include one or two or more elements selected from 0.05 mass % or less of Ag, B, Be, Cd, Co, Ga, Ge, Mo, Na, Ni, P, Pb, Sr, V, Hg, and Y.

In the present application document, contents of respective compositions constituting the core material mean values measured with an optical emission spectrometer (XPS).

In the aluminum alloy brazing sheet according to the present invention, the brazing material is cladded on one side surface or both side surfaces of the core material. The brazing material comprises 4.00 mass % to 13.00 mass % of Si and 0.10 mass % to 2.00 mass % of Mg, with the balance being Al and inevitable impurities.

In the aluminum alloy brazing sheet according to the present invention, the brazing material comprises Si.

Si comprised in the brazing material enhances flowability by decreasing the melting point of Al and exhibits the functions of the brazing substance.

The Si content in the brazing material is 4.00 mass % to 13.00 mass %, preferably 5.00 mass % to 12.50 mass %, and more preferably 6.00 mass % to 12.00 mass %.

The content of Si in the brazing material within the above range allows sufficient flowability to be exhibited and erosion to the core material or other parts to be joined to be reduced.

In the aluminum alloy brazing sheet according to the present invention, the brazing material comprises Mg.

Mg comprised in the brazing material easily weakens the amorphous aluminum oxide film in which the crystalline $Al_2O_3$ covering the surface of the brazing material locally exists during brazing heating, and thus the amorphous aluminum oxide film can be broken.

The Mg content in the brazing material is 0.10 mass % to 2.00 mass % and preferably 0.50 mass % to 1.50 mass %.

The content of Mg in the brazing material within the above range allows the brazing sheet provided with the amorphous aluminum oxide film in which the crystalline $Al_2O_3$ comprising a desired amount of Mg locally exists to be easily provided and sufficient brazing joint properties to be easily exhibited during brazing.

In the aluminum alloy brazing sheet according to the present invention, the brazing material may comprise Bi.

The Bi content in the brazing material is preferably 1.00 mass % or less, more preferably 0.01 mass % to 1.00 mass %, and further preferably 0.05 mass % to 0.60 mass %.

The content of Bi in the brazing material within the above range allows the surface tension of the brazing substance to be lowered during brazing to easily enhance the flowability of the brazing substance.

In the aluminum alloy brazing sheet according to the present invention, the brazing material may comprise one or two or more elements selected from Na, Sr, and Sb.

Each of the contents of Na, Sr, and Sb in the brazing material is preferably 0.05 mass % or less and more preferably 0.02 mass % or less.

In the aluminum alloy brazing sheet according to the present invention, the brazing material may comprise one or two or more elements selected from 8.00 mass % or less of Zn, 4.00 mass % or less of Cu, 1.00 mass % or less of Fe, 1.00 mass % or less of Mn, 0.30 mass % or less of Cr, 0.30 mass % or less of Ti, 0.30 mass % or less of Zr, 0.10 mass % or less of In, 0.10 mass % or less of Sb, and 0.10 mass % or less of Sn.

In the present application document, contents of respective compositions constituting the brazing material mean values measured with an optical emission spectrometer (XPS).

In the aluminum alloy brazing sheet according to the present invention, the integral value of Mg from the brazing material surface to a depth of 60 nm is 30 at %×nm to 600 at %×nm.

In the aluminum alloy brazing sheet according to the present invention, the integral value of Mg from the brazing material surface to a depth of 60 nm is preferably 40 at %×nm to 500 at %×nm % and more preferably 45 at %×nm to 400 at %×nm %.

In the aluminum alloy brazing sheet according to the present invention, the integral value of Mg from the brazing material surface to a depth of 60 nm within the above range allows generation of the MgO-concentrated layer to be reduced to suitably improve the brazing properties while the amorphous aluminum oxide film in which the crystalline $Al_2O_3$ comprising a desirable amount of Mg on the brazing material surface locally exists is formed to a certain extent.

In the aluminum alloy brazing sheet according to the present invention, an integral value of Mg of less than the above lower limit value indicates insufficient abundance of the crystalline $Al_2O_3$ comprising a desired amount of Mg acting as a start point of the reduction/break of the oxide film by excessively removing the amorphous aluminum oxide film in which the crystalline $Al_2O_3$ formed during the production of the brazing sheet locally exists. The melted brazing substance cannot be wet and spread on the surface because the aluminum oxide film is not broken and thus excellent brazing properties are difficult to exhibit.

In the aluminum alloy brazing sheet according to the present invention, an integral value of Mg of more than the above upper limit value indicates that the MgO film on the brazing sheet surface is thick. Therefore, the melted brazing substance cannot be wet and spread on the surface because the MgO film is not broken during brazing and thus excellent brazing properties are difficult to exhibit.

In the present application document, the integral value of Mg from the brazing material surface to a depth of 60 nm means an accumulated value of the Mg concentration to a depth of 60 nm when an X-ray photoelectron spectrometer (XPS) is used and an operation in which the brazing material surface is subjected to sputter treatment with argon ions to measure the Mg concentration in every 1-nm depth is repeated.

The Mg concentration in every 1-nm depth is specified from a sputter rate (sputter depth/sputter time) and a sputter time during XPS measurement. Such a sputter rate (sputter depth/sputter time) is calculated based on the time until the measured value of an O concentration becomes zero when the O concentration is measured with sputtering a $SiO_2$ thin film having a known thickness.

The aluminum alloy brazing sheet according to the present invention may further comprise an intermediate material formed of the aluminum alloy between the core material and the brazing material.

In the aluminum alloy brazing sheet according to the present invention, the intermediate material may be used as an intermediate material that does not generate the brazing substance or may be used as an intermediate material that generates the brazing substance.

In the case where the intermediate material is used as the intermediate that does not generate the brazing substance, the intermediate material performs a function of increasing the strength of the aluminum alloy sheet after brazing and a function of improving corrosion resistance by adjusting an electrical potential.

In the case where the intermediate material is used as the intermediate material that generates the brazing substance, the intermediate material performs a function of supplying a brazing substance having a different composition from that of the brazing material cladded on the outside of the intermediate material. The intermediate material may be the intermediate material that does not generate the brazing substance or may be the intermediate material that generates the brazing substance.

In the aluminum alloy brazing sheet according to the present invention, examples of the intermediate material may include one or two or more materials selected form aluminum and aluminum alloys.

In the case where the intermediate material is formed of aluminum, the purity of aluminum is not particularly limited and is preferably 99.0 mass % or more and particularly preferably 99.5 mass % or more.

In the case where the intermediate material is formed of the aluminum alloy, examples of the aluminum alloy may include an aluminum alloy comprising one or two or more selected from 1.50 mass % or less of Fe, 13.00 mass % or less of Si, 2.00 mass % or less of Cu, 2.00 mass % or less of Mn, 6.00 mass % or less of Zn, 0.30 mass % or less of Cr, 0.30 mass % or less of Ti, 0.30 mass % or less of Zr, 0.10 mass % or less of In, 0.10 mass % or less of Sn, 1.00 mass % or less of Bi, and 3.00 mass % or less of Mg, with the balance being Al and unavoidable impurities.

In the case where the intermediate material is formed of an aluminum alloy comprising Fe, the Fe content in the intermediate material is preferably 1.50 mass % or less and more preferably 0.10 mass % to 0.70 mass %.

The Fe content in the intermediate material within the above range allows the effect of strength improvement to be easily achieved. On the other hand, a Fe content in the intermediate material of more than the above upper limit value causes corrosion resistance to be low and giant compounds to be easily generated.

In the case where the intermediate material is formed of an aluminum alloy comprising Si and generates the brazing substance, the Si content in the intermediate material is preferably more than 2.00 mass % and 13.00 mass % or less and more preferably 4.00 mass % to 12.00 mass %.

The Si content in the intermediate material within the above range allows the melting point of the intermediate material to be lowered and the brazing substance to be easily generated.

In the case where the intermediate material is formed of an aluminum alloy comprising Si and does not generate the brazing substance, the Si content in the intermediate material is preferably 2.00 mass % or less and more preferably 0.10 mass % to 1.00 mass %.

The Si content in the intermediate material within the above range allows the strength of the brazing sheet to be easily increased.

In the case where the intermediate material is formed of an aluminum alloy comprising Cu, the Cu content in the intermediate material is preferably 2.00 mass % or less and more preferably 0.10 mass % to 1.00 mass %.

The Cu content in the intermediate material within the above range allows the strength of the brazing sheet to be easily increased and the potential to be easily adjusted. On the other hand, a Cu content in the intermediate material of more than the above upper limit value causes intergranular corrosion to easily occur and the melting point to be significantly lowered.

In the case where the intermediate material is formed of an aluminum alloy comprising Mn, the Mn content in the intermediate material is preferably 2.00 mass % or less and more preferably 0.30 mass % to 1.80 mass %.

The Mn content in the intermediate material within the above range allows the strength of the brazing sheet to be easily increased and the potential to be easily adjusted. On the other hand, a Mn content in the intermediate material of more than the above upper limit value causes cracking to easily occur during material rolling.

In the case where the intermediate material is formed of an aluminum alloy comprising Zn, the Zn content in the intermediate material is preferably 6.00 mass % or less and more preferably 0.50 mass % to 4.00 mass %.

The Zn content in the intermediate material within the above range allows the potential to be easily adjusted, excellent sacrificial corrosion prevention effect to be easily provided for preventing corrosion of the core material, and the corrosion resistance of the aluminum product after brazing to be easily improved. On the other hand, a Zn content in the intermediate material of more than the above upper limit value causes the natural electrode potential to be excessively low and the corrosion resistance to easily decrease.

In the case where the intermediate material is formed of an aluminum alloy comprising one or two or more elements selected from Ti, Zr, and Cr, the Ti content in the intermediate material is preferably 0.30 mass % or less and more preferably 0.10 mass % to 0.20 mass %, the Zr content in the intermediate material is preferably 0.30 mass % or less and more preferably 0.10 mass % to 0.20 mass %, and the Cr content in the intermediate material is preferably 0.30 mass % or less and more preferably 0.10 mass % to 0.20 mass %.

Ti, Zr, and Cr in the intermediate material within the above ranges allow the strength of the brazing sheet to be easily increased due to solid solution strengthening. On the other hand, Ti, Zr, or Cr contents in the intermediate material of more than the above upper limit values cause giant intermetallic compounds to be easily formed during casting, and plastic workability to be easily decreased.

In the case where the intermediate material is formed of an aluminum alloy comprising In, the In content in the intermediate material is preferably 0.10 mass % or less and more preferably 0.01 mass % to 0.03 mass %.

The In content in the intermediate material within the above range allows the corrosion of the core material to be easily prevented by setting the potential of the intermediate material less-noble and preferentially corroding the intermediate material against the core material.

On the other hand, an In content in the intermediate material of more than the above upper limit value causes the natural electrode potential to be excessively low and corrosion resistance to be easily decreased.

In the case where the intermediate material is formed of an aluminum alloy comprising Sn, the Sn content in the intermediate material is preferably 0.10 mass % or less and more preferably 0.01 mass % to 0.05 mass %.

The Sn content in the intermediate material within the above range allows the corrosion of the core material to be easily prevented by setting the potential of the intermediate material less-noble and preferentially corroding the intermediate material against the core material.

On the other hand, a Sn content in the intermediate material of more than the above upper limit value causes the natural electrode potential to be excessively low and corrosion resistance to be easily decreased.

In the case where the intermediate material is formed of an aluminum alloy comprising Bi, the Bi content in the intermediate material is preferably 1.00 mass % or less and more preferably 0.10 mass % to 1.00 mass %.

The Bi content in the intermediate material within the above range allows an effect of lowering the surface tension of the Al—Si melted brazing substance to be easily exhibited by acting so that the decrease in Bi concentration in the brazing material is reduced by melting the intermediate material into the brazing material, in the case where the brazing material melts during brazing heating to melt some of the core material. On the other hand, a Bi content in the intermediate material of more than the above upper limit value causes rolling to be likely to be difficult during the brazing sheet production.

In the case where the intermediate material is formed of an aluminum alloy comprising Mg, the Mg content in the intermediate material is preferably 3.00 mass % or less and more preferably 0.10 mass % to 1.80 mass %.

The Mg content in the intermediate material within the above range allows Mg to diffuse from the intermediate material to the brazing material during brazing heating and a Mg oxide formed by oxidizing on the brazing material surface to be less by acting so that a decrease in Mg concentration of the brazing material is reduced in the case where the brazing material is melted to melt some of the intermediate material, resulting in enhancing the breaking effect of the oxide films on the brazing sheet and the counterpart material due to Mg and easily exhibiting excellent brazing properties.

On the other hand, a Mg content in the intermediate material of more than the above upper limit value causes the melting point of the intermediate material to be excessively low to generate local melting of the core material during brazing heating, resulting in deforming the intermediate material and generating erosion of the intermediate material by the molted brazing substance, and thus easily lowering the brazing joint properties and corrosion resistance.

In the case where the intermediate material is formed of the aluminum alloy, an aluminum alloy in which the remainder other than the above compositions of the material may be Al and unavoidable impurities can be exemplified.

Examples of the above unavoidable impurities may include one or two or more elements selected from 0.05 mass % or less of Ag, B, Be, Bi, Ca, Cd, Co, Ga, Ge, Li, Mo, Na, Ni, P, Pb, Sr, V, Hg, and Y.

In the present application document, contents of respective compositions constituting the intermediate material mean values measured with an optical emission spectrometer (XPS).

Any one of the following aspects may be exemplified as the aluminum alloy brazing sheets according to the present invention:

(1) an aspect of a two-layer material in which the brazing material is cladded on only one side surface of the core material (core material/brazing material), (2) an aspect of a three-layer material in which the brazing material is cladded on both side surfaces of the core material (brazing material/core material/brazing material), (3) an aspect of a three-layer material in which the intermediate material is provided on one side surface of the core material and further the brazing material is cladded on the outer surface of the intermediate material (core material/intermediate material/brazing material), (4) an aspect of a four-layer material in which the intermediate material is provided on one side surface of the core material, further the brazing material is cladded on the outer surface of the intermediate material, and the brazing material is cladded on the other side surface of the core material (brazing material/core material/intermediate material/brazing material), and (5) an aspect of a five-layer material in which the intermediate material is provided on one side surface of the core material, further the brazing material is cladded on the outer surface of the intermediate material, the intermediate material is also provided on the other side surface of the core material, and the brazing material is further cladded on the outer surface of the intermediate material (brazing material/intermediate material/core material/intermediate material/brazing material).

In the aluminum alloy brazing sheet according to the present invention, the clad ratio of the brazing material cladded on one side surface or both side surfaces of the core material (the ratio of the thickness of the brazing material to the thickness of the aluminum alloy brazing sheet) is preferably 3.0% to 30.0%, more preferably 4% to 25%, and further preferably 5% to 20%.

In the case where the aluminum alloy brazing sheet according to the present invention employs the aspect of (2) the three-layer material with the brazing material cladded on both side surfaces of the core material or employs the aspect of (5) the five-layer material in which the intermediate material is provided on one side surface of the core material, further the brazing material is cladded on the outer surface of the intermediate material, the intermediate material is also provided on the other side surface of the core material, and the brazing material is further cladded on the outer surface of the intermediate material, the composition and clad ratio of each brazing material may be the same or different.

The thickness of the aluminum alloy brazing sheet according to the present invention can be appropriately set to a range of 0.04 mm to 5.00 mm and preferably from 0.05 mm to 2.00 mm.

The aluminum alloy brazing sheet according to the present invention is used as a forming material for fins serving as heat-transfer media in heat exchangers, tubes serving as flow channel forming material through which refrigerants and other materials pass, and plates joined with the tubes to form the structure of the heat exchangers.

In the case where the aluminum alloy brazing sheet according to the present invention is used for the fin material, the thickness of the brazing sheet is preferably about 0.04 mm to about 0.20 mm.

In the case where the aluminum alloy brazing sheet according to the present invention is used for the tube material, the thickness of the brazing sheet is preferably about 0.15 mm to about 0.50 mm.

In the case where the aluminum alloy brazing sheet according to the present invention is used for the plate material, the thickness of the brazing sheet is preferably about 0.80 mm to about 5.00 mm.

To the aluminum alloy brazing sheet according to the present invention, the surface of the brazing material may be subjected to etching treatment with an acid.

The etching allows the aluminum oxide film and the MgO film formed on the surface to be removed to a certain extent.

Details of the etching treatment will be described later.

According to the present invention, the brazing sheet having excellent brazing properties can be provided in the case where the aluminum material is brazed in the inert gas atmosphere such as the nitrogen gas atmosphere without using the flux.

Subsequently, the method for producing the aluminum alloy brazing sheet will be described.

The production method according to the present invention is a method for producing the aluminum alloy brazing sheet according to the present invention, the method comprising:

a step of performing heating during one or more times of annealing treatment selected from intermediate annealing during pass of cold rolling and final annealing after pass of final cold working so that a value of a diffusion amount D represented by Formula (I):

$$D = \Sigma D_0 \cdot \exp\left(-Q/(RTn)\right) \cdot \Delta tn \quad (I)$$

(in Formula (I), Tn represents a heating temperature (K) at each infinitesimal time when a total heating time (second) in the intermediate annealing and the final annealing is separated by an infinitesimal time $\Delta tn$ (second), $D_0=1.24\times10^{-4}$ (m²/s), Q=130 (kJ/mol), and R=8.3145 (J/mol·K)) is $7.0\times10^{-10}$ m² or less, when an aluminum alloy brazing sheet is produced by performing at least hot working, cold working, and one or more times of annealing treatment selected from one or more times of the intermediate annealing during pass of rolling in the cold working and the final annealing after pass of the final cold working to a stacked product with an ingot for the core material and an ingot for the brazing material on one side surface or both side surfaces of the ingot for the core material stacked.

In the method for producing the aluminum alloy brazing sheet according to the present invention, aluminum or the aluminum alloy each comprising the desired chemical compositions for the core material, the brazing material, and, if necessary, the intermediate material is first melted and cast, whereby an ingot for the core material, an ingot for the brazing material, and, if necessary, an ingot for the intermediate material are prepared. These melting and casting methods are not particularly limited and common methods may be used.

Subsequently, the ingot for the core material and the ingot for the brazing material, and if necessary, the ingot of the intermediate material are preferably subjected to homogenization treatment in an appropriate manner. The preferable temperature range of the homogenization treatment is 400° C. to 600° C. and the homogenization treatment time is 2 hours to 20 hours.

Subsequently, the ingot for the core material and the ingot for the brazing material and, if necessary, the ingot for the intermediate material are processed to a predetermined thickness by surface grinding or hot rolling, and thereafter the ingots are stacked in a predetermined order to form a stacked product.

For example, in the case where the brazing sheet comprising a three-layer structure in which the brazing material is cladded on both side surfaces of the core material is prepared, the ingot for the brazing material may be overlapped on both side surfaces of the ingot for the core material to form a stacked product having the three-layer structure (cladded ingot).

The ingot for the core material and the ingot for the brazing material, and the ingot for the intermediate material used if necessary comprise compositions corresponding to the compositions of the core material, the brazing material, and the intermediate material, respectively, which constitute the aluminum alloy brazing sheet to be obtained.

In the method for producing the aluminum alloy brazing sheet according to the present invention, the stacked product is subjected to at least hot working, cold working, and one or more times of annealing treatment selected from one or more times of intermediate annealing during pass of rolling in the cold working and final annealing after pass of the final cold working.

In the hot working, the stacked product in which the ingots are stacked in a predetermined order is hot-rolled at 400° C. to 500° C. In hot-rolling, for example, the stacked product is rolled until the sheet thickness reaches 2 mm to 8 mm.

In the cold working, the hot-rolled product obtained by the hot working is rolled by cold rolling. In the cold working, the cold rolling is performed in a plurality of times of passes.

In the cold working, one or more times of the intermediate annealing during the pass of the cold rolling is preferably performed so that the heating temperature is 200° C. to 500° C. and more preferably performed so that the heating temperature is 250° C. to 400° C.

In the intermediate annealing, the temperature is raised to the intermediate annealing temperature and after reaching the intermediate annealing temperature, cooling may be started immediately, or after the temperature reaches the intermediate annealing temperature, the temperature is held at the intermediate annealing temperature for a certain period of time and thereafter cooling may be started. The holding time at the intermediate annealing temperature is 0 hours to 10 hours and preferably 1 hour to 5 hours.

After the cold rolling, the obtained cold-rolled product is appropriately subjected to the final annealing.

The final annealing is preferably performed so that the heating temperature is 300° C. to 500° C. and more preferably performed so that the temperature is 350° C. to 450° C.

In the final annealing, the temperature is raised to the final annealing temperature and after reaching the final annealing temperature, cooling may be started immediately, or after the temperature reaches the final annealing temperature, the temperature is held at the final annealing temperature for a certain period of time and thereafter cooling may be started. The holding time at the final annealing temperature is 0 hours to 10 hours and preferably 1 hour to 5 hours.

The atmospheres during the intermediate annealing and the final annealing are not particularly limited and the intermediate annealing and the final annealing may be performed in air. The intermediate annealing and the final annealing are preferably preformed in an atmosphere having a lower oxygen concentration than that of the air. Heating in the atmosphere having lower oxygen concentration than that of the air allows the growth of the oxide film on the surface of the brazing material to be reduced.

In the method for producing the aluminum alloy brazing sheet according to the present invention, the intermediate annealing or the final annealing is preferably performed in a state where the ingot for the brazing material is rolled to a thickness of 10 μm to 50 μm and more preferably performed in a state where the ingot for the brazing material is rolled to a thickness of 20 μm to 50 μm.

Controlling the thickness of the ingot for the brazing material during the intermediate annealing or the final annealing within the above range allows the Mg concentration diffusing from the ingot for the core material to the surface of the ingot for the brazing material to be reduced, formation and growth of the MgO film to be reduced, the amorphous aluminum oxide film in which the crystalline $Al_2O_3$ comprising a desired amount of Mg locally exists to be easily formed on the surface of the brazing sheet, and desired brazing properties to be easily exhibited.

In the method for producing the aluminum alloy brazing sheet according to the present invention, heating during one or more times of annealing treatment selected from the intermediate annealing during the pass of the cold rolling and the final annealing after the pass of the final cold working is performed so that the value of a diffusion amount D represented by Formula (I):

$$D = \Sigma D_0 \cdot \exp\left(-Q/(RTn)\right) \cdot \Delta tn \quad (I)$$

(in Formula (I), Tn represents a heating temperature (K) at each infinitesimal time when a total heating time (second) in the intermediate annealing and the final annealing is separated by an infinitesimal time $\Delta tn$ (second), $D_0=1.24\times10^{-4}$ (m²/s), Q=130 (kJ/mol), and R=8.3145 (J/mol·K)) is $7.0\times10^{-10}$ m² or less.

In the method for producing the aluminum alloy brazing sheet according to the present invention, heating during one or more times of annealing treatment selected from the intermediate annealing during the pass of the cold rolling and the final annealing after the pass of the final cold working is performed so that the value of the diffusion amount D is $7.0\times10^{-10}$ m² or less, preferably performed so that the value is $5.0\times10^{-10}$ m² or less, and more preferably performed so that the value is $2.0\times10^{-10}$ m² or less.

The lower limit value of the diffusion amount D is not particularly limited and the diffusion amount D is usually $1.0\times10^{-16}$ m² or more.

Performing heating during the intermediate annealing during the pass of the cold rolling and the final annealing after the pass of the final cold working so that the value of the diffusion amount D is $7.0\times10^{-10}$ m² or less allows an amorphous aluminum oxide film to grow on the brazing material surface and the crystalline $Al_2O_3$ to be formed in such an amorphous aluminum oxide film, and defects to be generated at the interface between the amorphous aluminum oxide film and the crystalline $Al_2O_3$ or inside the crystalline $Al_2O_3$ and the diffusion amount of Mg diffusing into the surface layer of the ingot for the brazing to be controlled.

In the method for producing an aluminum alloy brazing sheet according to the present invention, heating during the intermediate annealing during the pass of the cold rolling and the final annealing after the pass of the final cold working allows Mg to diffuse toward the brazing material surface layer. The amount of the diffusion is easily controlled by controlling the temperature and time during the intermediate annealing and the final annealing so that the diffusion amount D determined by Formula (I) is $7.0\times10^{-10}$ m² or less.

According to common methods, controlling the final maximum temperature by heating treatment and the time held at this temperature is considered to give an appropriate diffusion effect.

However, as described above, the aluminum alloy brazing sheet obtained by the production method according to the present invention is formed by controlling so that the integral value of Mg from the brazing material surface to a depth of 60 nm is 30 at %×nm to 600 at %×nm. In order to control the integral value of Mg to an appropriate value, the total heat input amount in all processes during the intermediate annealing and the final annealing is required to be appropriately controlled, and thus in order to satisfy such requirement, the diffusion amount D determined by Formula (I) is controlled so as to be $7.0\times10^{-10}$ m² or less, preferably $5.0\times10^{-10}$ m² or less, and more preferably $2.0\times10^{-10}$ m² or less.

In the method for producing an aluminum alloy brazing sheet according to the present invention, the surface of the brazing sheet may be subjected to etching treatment with acid, if necessary.

In the method for producing an aluminum alloy brazing sheet according to the present invention, the etching treatment is performed so that the integral value of Mg from the brazing material surface to a depth of 60 nm is 30 at %×nm to 600 at %×nm, preferably 40 at %×nm to 500 at %×nm %, and more preferably 45 at %×nm to 400 at %×nm %.

The timing of performing the etching treatment is not particularly limited as long as the timing is between after performing the hot rolling and before performing brazing using the brazing sheet.

For example, etching treatment may be applied to the clad sheet after the hot rolling or may be applied to the clad sheet in the middle of the cold rolling. The etching treatment may also be applied after the intermediate annealing or the final annealing.

In addition, after the final annealing described above is completed, the brazing sheet may be stored in a state where the oxide film is comprised and the etching treatment may be applied immediately before brazing.

Forming the amorphous aluminum oxide film in which the crystalline $Al_2O_3$ comprising the desired amount of Mg locally exists due to the weakening or removal of the MgO-concentrated layer during brazing allows the brazing properties during brazing using the brazing sheet to be improved.

In the case where the brazing sheet is subjected to the etching treatment, when the brazing sheet is cladded with the brazing material on only one side surface, only the surface cladded with the brazing material may be etched or both side surfaces may be etched.

In the case where the brazing sheet is cladded with the brazing material on both side surfaces, both side surfaces are preferably etched.

As described above, applying the etching treatment allows the MgO film formed on the brazing material surface to be weakened or removed, the amorphous aluminum oxide film in which the crystalline $Al_2O_3$ comprising the desired amount of Mg locally exists to be formed, and the Mg concentration on the brazing material surface to be controlled to the desired range.

For example, for materials having a thin sheet thickness such as fin materials used in automotive heat exchangers, the etching treatment process may be placed before the annealing process due to restriction of the facility. Even in such a case, the etching treatment is effective in reducing the Mg concentration on the brazing material surface. In addition, the oxide film can be weakened and brazing properties can be easily improved by setting appropriate etching treatment conditions in the subsequent annealing process.

Examples of acids used for the etching treatment of the brazing sheet may include aqueous solutions of sulfuric acid, hydrochloric acid, nitric acid, phosphoric acid, and hydrofluoric acid. These acids may be used alone or used in combination of two or more acids. From the viewpoint of removing the oxide film more efficiently, use of a mixed aqueous solution comprising hydrofluoric acid and an acid other than hydrofluoric acid as the acid is preferable and use of a mixed aqueous solution of hydrofluoric acid and sulfuric acid or hydrofluoric acid and nitric acid is more preferable.

Examples of alkaline solutions used for the etching treatment of the brazing sheet include aqueous solutions of sodium hydroxide, potassium hydroxide, and calcium hydroxide. These alkaline solutions may be used alone or in combination of two or more alkaline solutions. In the case where the etching is performed using the alkaline solution, desmutting treatment is preferably performed using the aqueous sulfuric acid solution or the aqueous nitric acid solution after the etching.

The etching amount during the etching treatment is preferably 0.02 g/m² to 0.40 g/m². Setting the etching amount to 0.03 g/m² or more and more preferably 0.10 g/m² or more allows the oxide film on the brazing sheet surface to be sufficiently removed and the brazing properties to be further improved.

From the viewpoint of improving the brazing properties of the brazing sheet, the upper limit of the amount of etching does not exists.

However, excessive amount of the etching results in removing the amorphous aluminum oxide film in which the crystalline $Al_2O_3$ comprising the desired amount of Mg locally exists. Therefore, the aluminum oxide film formed thereafter is an amorphous aluminum oxide film comprising Mg diffused from the brazing material (in which the crystalline $Al_2O_3$ does not exist). Consequently, the effect of improving the brazing properties is difficult to obtain.

Setting the etching amount to 0.40 g/m² or less and more preferably 0.20 g/m² or less allows the problems described above to be easily avoided.

In the method for producing an aluminum alloy brazing sheet according to the present invention, the aluminum alloy brazing sheet as the target can be obtained as described above.

Details of the obtained aluminum alloy brazing sheet are as described in detail in the description of the aluminum alloy brazing sheet according to the present invention.

According to the present invention, the brazing sheet having excellent brazing properties can be easily produced in the case where the aluminum material is brazed in the inert gas atmosphere such as the nitrogen gas atmosphere without using the flux.

Hereinafter, the present invention will be specifically described with reference to Examples. The present invention, however, is not limited to Examples described below.

EXAMPLE

Example 1

(1) An Ingot for a Core Material and an Ingot for a Brazing Material Formed of Aluminum Alloys Comprising the Chemical Compositions Listed in Tables 1 and 2 were Prepared by Die Casting (DC).

Subsequently, the ingot for the core material was subjected to surface grinding to set the sheet thickness of the ingot for the core material to a predetermined thickness. Subsequently, the ingot for the brazing material was subjected to hot rolling to set the sheet thickness of the ingot of the brazing material to a predetermined thickness.

The thus obtained ingot for the core material and ingot for the brazing material were stacked by overlapping with each other to give a stacked product comprising a two-layer structure (comprising a structure of the ingot for the brazing material/the ingot for the core material) in which the ingot for the brazing material was stacked on one side surface of the ingot of the core material.

A cladded material having a sheet thickness of 2.6 mm was prepared by hot rolling the obtained stacked product to join the ingot for the core material and the ingot for the brazing material.

(2) The Clad Material Obtained in (1) was Cold Rolled to Give a Cold-Rolled Product Having a Thickness of 0.20 mm.

Subsequently, final annealing in which the obtained cold-rolled product was heated in an air atmosphere while a heating temperature and a heating time were controlled so that the value of a diffusion amount D represented by Formula (I):

$$D = \Sigma D_0 \cdot \exp\left(-Q/(RTn)\right) \cdot \Delta tn \qquad (I)$$

(in Formula (I), Tn represents a heating temperature (K) at each infinitesimal time when a total heating time (second) in the final annealing is separated by an infinitesimal time $\Delta tn$ (second), $D^0=1.24\times10^{-4}$ (m²/s), Q=130 (kJ/mol), and R=8.3145 (J/mol·K)) was $1.2\times10^{-10}$ m² was applied.

Subsequently, in order to control an integral value of Mg from the surface to 60 nm or less, by performing etching treatment on the brazing material with an acid, test specimens of aluminum alloy brazing sheets A to C formed of a two-layer structure of the brazing material/the core material, having a clad ratio of the brazing material provided on one side surface of the core material of 10.8%, and having a thickness of 0.20 mm were obtained. Among Test specimen A, Test specimen B, and Test specimen C, the time of the etching treatment was varied.

The integral values of Mg of the obtained test specimens from the brazing material surface to a depth of 60 nm were measured with an X-ray photoelectron spectrometer (XPS, PHI 5000 VersaProbe III manufactured by ULVAC-PHI, INCORPORATED). The results are listed in Table 3.

<Evaluation of Brazing Properties>

As illustrated in a perspective view and a side view in FIG. 1(a) and FIG. 1(b), respectively, the obtained test specimen of the aluminum alloy brazing sheet (dimensions: a width of 20 mm, a length of 30 mm, and a thickness of 0.20 mm) was located as a horizontal sheet and an A3003-O aluminum alloy sheet (dimensions: a thickness of 1.0 mm, a width of 15 mm, and a length of 25 mm) was located on this horizontal sheet as a vertical sheet. Furthermore, a spacer having a diameter of 1.6 mm was inserted at an end part of the vertical sheet and the sheets were fixed by a fixing jig while the vertical sheet was apart from the horizontal sheet to assemble a reverse T-shaped clearance filling test specimen.

Subsequently, the reverse T-shaped clearance filling test specimen was inserted into a furnace with a nitrogen gas atmosphere having an average oxygen concentration of 1 volume ppm and a dew point of −50° C. and a brazing heating test was performed under conditions of a temperature rising rate of 100° C./min from room temperature to 600° C. and retention at 600° C. for three minutes. Subsequently, the test specimen was cooled to 500° C. or less in the furnace and thereafter carried to the outside of the furnace to take out the test specimen.

For the reverse T-shaped clearance filling test specimen after the heating test obtained from the above procedure, a fillet filling length from the contact point of the horizontal sheet and the vertical sheet illustrated in FIG. 1(b) was measured and the brazing properties were evaluated in accordance with the following criteria. The results are listed in Table 3.

(Evaluation Criteria of Brazing Properties)

The filling length is 3.0 mm or more: ○ (acceptable (excellent brazing properties))

The filling length is less than 3.0 mm: x (not acceptable (poor brazing))

Example 2

In Example 1, the final annealing in which the cold-rolled product was heated in an air atmosphere while a heating temperature and a heating time were controlled so that the value of a diffusion amount D represented by Formula (I):

$$D = \Sigma D_0 \cdot \exp\left(-Q/(RTn)\right) \cdot \Delta tn \quad (I)$$

(in Formula (I), Tn represents a heating temperature (K) at each infinitesimal time when a total heating time (second) in the final annealing is separated by an infinitesimal time $\Delta tn$ (second), $D_0 = 1.24 \times 10^{-4}$ (m²/s), Q=130 (kJ/mol), and R=8.3145 (J/mol·K)) was $1.3 \times 10^{-13}$ m² was performed. The test specimens were determined to be a test specimen obtained by performing the etching treatment to the same degree as Test specimen B (Test specimen D) and a test specimen obtained without performing the etching treatment (Test specimen E). Other conditions were the same as those in Example 1 to give Test specimen D and Test specimen E that were the aluminum alloy brazing sheets having a clad ratio of the brazing material provided on one side surface of the core material of 10.8% and a thickness of 0.20 mm.

For the obtained Test specimen D and Test specimen E, the integral value of Mg from the brazing material surface to a depth of 60 nm was measured in the same manner as the manner in Example 1 and the brazing properties were evaluated. The results are listed in Table 3.

Example 3

In Example 1, the final annealing in which the cold-rolled product was heated in an air atmosphere while a heating temperature and a heating time were controlled so that the value of a diffusion amount D represented by Formula (I):

$$D = \Sigma D_0 \cdot \exp\left(-Q/(RTn)\right) \cdot \Delta tn \quad (I)$$

(in Formula (I), Tn represents a heating temperature (K) at each infinitesimal time when a total heating time (second) in the final annealing is separated by an infinitesimal time $\Delta tn$ (second), $D_0 = 1.24 \times 10^{-4}$ (m²/s), Q=130 (kJ/mol), and R=8.3145 (J/mol·K)) was $3.3 \times 10^{-10}$ m² was performed and the etching treatment was not performed. Other conditions were the same as those in Example 1 to give Test specimen F that was the aluminum alloy brazing sheet having a clad ratio of the brazing material provided on one side surface of the core material of 10.8% and a thickness of 0.20 mm. The results are listed in Table 3.

Comparative Example 1

A test specimen for comparison G that was the aluminum alloy brazing sheet having a clad ratio of the brazing material provided on one side surface of the core material of 10.8% and a thickness of 0.20 mm was obtained in the same manner as the manner in Example 1 except that the etching treatment was performed so that the etching amount was large.

For the obtained Test specimen G, the integral value of Mg from the brazing material surface to a depth of 60 nm was measured in the same manner as the manner in Example 1 and the brazing properties were evaluated. The results are listed in Table 3.

Comparative Example 2

The final annealing in which the cold-rolled product was heated in an air atmosphere while a heating temperature and a heating time were controlled so that the value of a diffusion amount D represented by Formula (I):

$$D = \Sigma D_0 \cdot \exp\left(-Q/(RTn)\right) \cdot \Delta tn \quad (I)$$

(in Formula (I), Tn represents a heating temperature (K) at each infinitesimal time when a total heating time (second) in the final annealing is separated by an infinitesimal time $\Delta tn$ (second), $D_0 = 1.24 \times 10^{-4}$ (m²/s), Q=130 (kJ/mol), and R=8.3145 (J/mol·K)) was $4.2 \times 10^{-10}$ m² was performed and the etching treatment was not performed. Other conditions were the same as those in Example 1 to give Test specimen H that was the aluminum alloy brazing sheet having a clad ratio of the brazing material provided on one side surface of the core material of 10.8% and a thickness of 0.20 mm.

For the obtained Test specimen H, the integral value of Mg from the brazing material surface to a depth of 60 nm was measured in the same manner as the manner in Example 1 and the brazing properties were evaluated. The results are listed in Table 3.

TABLE 1

| <Composition of ingot for brazing material> | | | | | | | |
|---|---|---|---|---|---|---|---|
| Si | Fe | Cu | Mn | Mg | Zn | Bi | Al |
| 11.80 | 0.43 | — | — | 0.81 | — | 0.17 | Bal.* |

(Unit: mass %)
*In Table 1, "Bal." means the balance.

TABLE 2

| <Composition of ingot for core material | | | | | |
|---|---|---|---|---|---|
| Si | Fe | Cu | Mn | Mg | Al |
| 0.50 | 0.20 | 0.15 | 1.20 | — | Bal.* |

(Unit: mass %)
*In Table 2, "Bal." means the balance.

TABLE 3

| | Test specimen | Diffusion amount D during annealing (m²) | Etching amount (g/m²) | Accumulated value of Mg (at % × nm) | Filling length (mm) | Determination |
|---|---|---|---|---|---|---|
| Example | Test specimen A | $1.2 \times 10^{-10}$ | 0.15 | 50 | 8.5 | ○ |
| | Test Specimen B | $1.2 \times 10^{-10}$ | 0.05 | 70 | 9.2 | ○ |

TABLE 3-continued

|  | Test specimen | Diffusion amount D during annealing (m²) | Etching amount (g/m²) | Accumulated value of Mg (at % × nm) | Filling length (mm) | Determination |
|---|---|---|---|---|---|---|
|  | Test specimen C | $1.2 \times 10^{-10}$ | 0.03 | 115 | 7.2 | ○ |
|  | Test specimen D | $1.3 \times 10^{-13}$ | 0.07 | 49 | 10.0 | ○ |
|  | Test specimen E | $1.3 \times 10^{-13}$ | 0 | 90 | 8.0 | ○ |
|  | Test specimen F | $3.3 \times 10^{-13}$ | 0 | 590 | 3.2 | ○ |
| Comparative Example | Test specimen G | $1.2 \times 10^{-10}$ | 0.49 | 29 | 2.8 | x |
|  | Test specimen H | $4.2 \times 10^{-10}$ | 0 | 634 | 2.9 | x |

As can be seen from Table 3, Test specimen A to Test specimen F of the aluminum alloy brazing sheets obtained in Example 1 to Example 3 comprise the core material and the brazing material cladded on the one side surface of the core material and the core material is formed of the aluminum alloy, the brazing material comprises 4.00 mass % to 13.00 mass % of Si and 0.10 mass % to 2.00 mass % of Mg, with the balance being Al and unavoidable impurities, and the integral value of Mg from the brazing material surface to a depth of 60 nm is 30 at %×nm to 600 at %×nm. Consequently, the filling length at the time of the evaluation of the brazing properties is 3.0 mm or more and all Test specimens are evaluated as "○", which indicates excellent brazing properties (joint properties) for every Test specimen.

On the other hand, as can be seen from Table 3, Test specimen G and Test specimen H of the aluminum alloy brazing sheets obtained in Comparative Example 1 and Comparative Example 2 comprise the core material and the brazing material cladded on the one side surface of the core material and the integral value of Mg from the brazing material surface to a depth of 60 nm is out of the range of 30 at %×nm to 600 at %×nm. Consequently, the filling length during the evaluation of the brazing properties is less than 3.0 mm and both Test specimens are evaluated as "x", which indicates inferior brazing properties (joint properties) for both Test specimens.

INDUSTRIAL APPLICABILITY

According to the present invention, the brazing sheet that can exhibit excellent brazing properties in the case where the aluminum material is brazed in the inert gas atmosphere such as the nitrogen gas atmosphere without using the flux and the method for producing the same can be provided.

The invention claimed is:

1. An aluminum alloy brazing sheet used for brazing in an inert gas atmosphere without using a flux, the aluminum alloy brazing sheet comprising:
a core material; and
a brazing material cladded on one side surface or both side surfaces of the core material, wherein
the core material is formed of aluminum or an aluminum alloy,
the brazing material comprises 4.00 mass % to 13.00 mass % of Si and comprises 0.50 mass % to 2.00 mass % of Mg, with the balance being Al and inevitable impurities, and an integral value of Mg from a surface of the brazing material to a depth of 60 nm is 30 at % ×nm to 600 at % ×nm.

2. The aluminum alloy brazing sheet according to claim 1, wherein the brazing material further comprises one or two or more elements selected from 1.00 mass % or less of Bi, 0.05 mass % or less of Na, 0.05 mass % or less of Sr, 0.05 mass % or less of Sb, 8.00 mass % or less of Zn, 4.00 mass % or less of Cu, 1.00 mass % or less of Fe, 1.00 mass % or less of Mn, 0.30 mass % or less of Cr, 0.30 mass % or less of Ti, 0.30 mass % or less of Zr, 0.10 mass % or less of In, and 0.10 mass % or less of Sn.

3. The aluminum alloy brazing sheet according to claim 1, further comprising an intermediate material formed of aluminum or an aluminum alloy between the core material and the brazing material.

4. A method for producing the aluminum alloy brazing sheet according to claim 1, the method comprising:
a step of performing heating during one or more times of annealing treatment selected from intermediate annealing during pass of cold rolling and final annealing after pass of final cold working so that a value of a diffusion amount D represented by Formula (I):

$$D = \Sigma D_0 \cdot \exp\left(-Q/(RT_n)\right) \cdot \Delta t_n \quad (I)$$

(in Formula (I), Tn represents a heating temperature (K) at each infinitesimal time when a total heating time (second) in the intermediate annealing and the final annealing is separated by an infinitesimal time Δtn (second), $D_0$=1.24×10-4 (m²/s), Q=130 (KJ/mol), and R=8.3145 (J/mol·K)) is 7.0× $10^{-10}$ m² or less, when an aluminum alloy brazing sheet is produced by performing at least hot working, cold working, and one or more times of annealing treatment selected from one or more times of the intermediate annealing during pass of rolling in the cold working and the final annealing after pass of the final cold working to a stacked product with an ingot for the core material and an ingot for the brazing material on one side surface or both side surfaces of the ingot for the core material stacked.

5. The method for producing the aluminum alloy brazing sheet according to claim 4, wherein an annealed product is obtained by applying one or more times of annealing treatment selected from the one or more times of the intermediate annealing during pass of the rolling in the cold working and the final annealing after pass of the final cold working and thereafter an etching treatment of the brazing material surface of the annealed product is performed using one of or both of an acid and an alkaline solution.

* * * * *